United States Patent
Tulabandhula et al.

(10) Patent No.: US 11,334,959 B2
(45) Date of Patent: May 17, 2022

(54) METHOD AND SYSTEM FOR MANAGING ALLOCATION OF TRANSPORTATION SERVICES

(71) Applicant: Conduent Business Services, LLC, Dallas, TX (US)

(72) Inventors: Theja Tulabandhula, Bangalore (IN); Koushik Chattopadhyay, West Bengal (IN); Koyel Mukherjee, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 347 days.

(21) Appl. No.: 15/368,865

(22) Filed: Dec. 5, 2016

(65) Prior Publication Data
US 2018/0158166 A1    Jun. 7, 2018

(51) Int. Cl.
| | | |
|---|---|---|
| *G06Q 50/30* | (2012.01) | |
| *H04L 67/51* | (2022.01) | |
| *G06Q 10/06* | (2012.01) | |
| *G06Q 10/02* | (2012.01) | |

(52) U.S. Cl.
CPC .............. *G06Q 50/30* (2013.01); *G06Q 10/02* (2013.01); *G06Q 10/06393* (2013.01); *H04L 67/16* (2013.01)

(58) Field of Classification Search
CPC .. G06Q 50/30; G06Q 10/02; G06Q 10/06393; H04L 67/16
See application file for complete search history.

(56) References Cited

U.S. PATENT DOCUMENTS

| | | | | |
|---|---|---|---|---|
| 2012/0109721 | A1* | 5/2012 | Cebon | G06Q 30/06 705/13 |
| 2013/0246301 | A1* | 9/2013 | Radhakrishnan | G06Q 30/0282 705/347 |
| 2015/0161564 | A1* | 6/2015 | Sweeney | G06Q 10/063114 705/338 |

(Continued)

OTHER PUBLICATIONS

"5 Tips for First Time Uber Passengers" by CiCi Elle, Dec. 1, 2015; http://cicielle.com/blog/reviews/uber-promo-code/ (Year: 2015).*

(Continued)

*Primary Examiner* — George Chen
*Assistant Examiner* — Wayne S. Murray
(74) *Attorney, Agent, or Firm* — Jones Robb, PLLC

(57) ABSTRACT

The disclosed embodiments illustrate methods and systems for managing allocation of transportation services. The method includes receiving real-time vehicle data of vehicles of a plurality of service types from sensors associated with the vehicles. The method further includes detecting an availability status of each of the vehicles based on at least the received real-time vehicle data and a service request for a vehicle of a preferred service type for travel by a customer, to determine available service types. The method further includes rendering, in response to the service request, at least the available service types that comprises at least a flexible service type, at a user interface of a customer-computing device. The method further includes allocating the transportation services of the service provider to the customer based on a selection of a service type from the rendered plurality of available service types by the customer.

14 Claims, 4 Drawing Sheets

(56) References Cited

U.S. PATENT DOCUMENTS

| | | | | |
|---|---|---|---|---|
| 2015/0294431 A1* | 10/2015 | Fiorucci | ............... | G06Q 50/26 705/13 |
| 2016/0042303 A1* | 2/2016 | Medina | ............... | G06Q 10/02 705/5 |
| 2016/0117610 A1* | 4/2016 | Ikeda | ................... | G06Q 10/02 705/5 |
| 2018/0025408 A1* | 1/2018 | Xu | ......................... | G08G 1/00 705/26.81 |
| 2018/0032928 A1* | 2/2018 | Li | ......................... | G06Q 10/06 |
| 2018/0091604 A1* | 3/2018 | Yamashita | ............ | G06Q 50/30 |

OTHER PUBLICATIONS

"5 Tips for First Time Uber Passengers" by CiCi Elle, Picture 2, Dec. 1, 2015; http://cicielle.com/blog/reviews/uber-promo-code/; http://cicielle.com/wp-content/uploads/2015/12/Uber-Review.jpg (Year: 2015).*

Andréasson I. "Reallocation of Empty Personal Rapid Transit Vehicles en Route". Transportation Research Record. 2003;1838(1): 36-41. doi:10.3141/1838-05 (Year: 2003).*

Guillermo Gallego, Garud Iyengar, R Phillips, and Abha Dubey. Managing exible products on a network. CORC Technical Report TR-2004-01, 2004.

Adam N Elmachtoub and Yehua Wei. Retailing with opaque products. Available at SSRN 2659211, 2015.

Guillermo Gallego and Robert Phillips. Revenue management of exible products. Manufacturing & Service Operations Management, 6(4):321-337, 2004.

* cited by examiner

METHOD AND SYSTEM FOR MANAGING ALLOCATION OF TRANSPORTATION SERVICES

TECHNICAL FIELD

The presently disclosed embodiments are related, in general, to transportation services. More particularly, the presently disclosed embodiments are related to methods and systems for managing allocation of transportation services of a service provider.

BACKGROUND

Recent developments in the field of transportation services have led to the evolution of online platforms that may cater to various travelling requirements of customers. For example, the customers may utilize an online platform provided by a service provider, to request for vehicles of a particular service type. In response to the received request, the service provider, such as an on-demand transport provider, an intelligent multi-modal trip planner, and a ride-sharing marketplace, may provide several options or services to the customers that are substitutable. Typically, these customers are allowed to choose any of these options or services, and then the service provider may optimally allocate resources to the customers to maximize key performance indicators (KPIs), such as number of allocations, services utilization, revenue or measures of quality of the services.

In certain scenarios, when the demand is ill-matched with the supply of these services, the service provider may lose sales due to demand exceeding supply for certain substitutable products or demand being much lesser for certain other substitutable products. Therefore, a robust method and system may be required that not only aims at facilitating more useful services to the customers but also optimizes the various KPIs of the service provider.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for managing, by a computing server, allocation of transportation services of a service provider to customers. The method includes receiving, by a transceiver at the computing server, a service request from a customer-computing device associated with a customer over a communication network. The service request may comprise a request for a vehicle of a preferred service type for travel. The method further includes receiving, by the transceiver, real-time vehicle data of a plurality of vehicles of a plurality of service types associated with the service provider, from one or more sensors in the plurality of vehicles over the communication network. The method further includes detecting, by a processor at the computing server, an availability status of each of the plurality of vehicles based on the received real-time vehicle data and the received service request. The availability status of each of the plurality of vehicles may be detected to determine a plurality of available service types in a plurality of service types for the travel. The method further includes rendering, by the processor, in response to the received service request, at least the determined plurality of available service types at a user interface displayed on a display screen of the customer-computing device over the communication network. The determined plurality of available service types may comprise at least a flexible service type. The flexible service type may be determined based on the plurality of available service types. The method further includes allocating, by the processor, the transportation services of the service provider to the customer based on a selection of a service type from the rendered plurality of available service types by the customer for the travel. Further, one or more key performance indicators (KPIs) for the service provider may be controlled based on the allocation. Further, one or more offerings may be provided to the customer based on the allocation.

According to embodiments illustrated herein, there is provided a system for managing allocation of transportation services of a service provider to customers. The system may correspond to a computing server that includes a transceiver. The transceiver may be configured to receive a service request from a customer-computing device associated with a customer over a communication network. The service request may comprise a request for a vehicle of a preferred service type for travel. The transceiver may further receive real-time vehicle data of a plurality of vehicles of a plurality of service types associated with the service provider, from one or more sensors in the plurality of vehicles over the communication network. The system further includes a processor that may be configured to detect an availability status of each of the plurality of vehicles based on the received real-time vehicle data and the received service request. The availability status of each of the plurality of vehicles may be detected to determine a plurality of available service types in the plurality of service types for the travel. The processor may further render, in response to the received service request, at least the determined plurality of available service types at a user interface displayed on a display screen of the customer-computing device over the communication network. The determined plurality of available service types may comprise at least a flexible service type. The flexible service type may be determined based on the plurality of available service types. The processor may further allocate the transportation services of the service provider to the customer based on a selection of a service type from the rendered plurality of available service types by the customer for the travel. Further, one or more key performance indicators (KPIs) for the service provider may be controlled based on the allocation. Further, one or more offerings may be provided to the customer based on the allocation.

According to embodiments illustrated herein, there is provided a computer program product for use with a computing device. The computer program product comprises a non-transitory computer readable medium storing a computer program code for managing allocation of transportation services of a service provider to customers. The computer program code is executable by one or more processors in a computing device to receive a service request from a customer-computing device associated with a customer over a communication network. The service request may comprise a request for a vehicle of a preferred service type for travel. The computer program code is further executable by the one or more processors to receive real-time vehicle data of a plurality of vehicles of a plurality of service types associated with the service provider, from one or more sensors in the plurality of vehicles over the communication network. The computer program code is further executable by the one or more processors to detect an availability status of each of the plurality of vehicles based on the received real-time vehicle data and the received service request. The availability status of each of the plurality of vehicles may be detected to determine a plurality of available service types in the plurality of service types for the travel. The computer program code is further executable by the one or more processors to render, in response to the received service request, at least the determined plurality of available service types at a user interface displayed on a display screen of the customer-computing device over the communication network. The determined plurality of available service types may comprise at least a flexible service type. The flexible service type may be determined based on the plurality of available service types. The computer program code is further executable by the one or more processors to allocate the transportation services of the service provider to the customer based on a selection of a service type from the rendered plurality of available service types by the customer for the travel. Further, one or more key performance indicators (KPIs) for the service provider may be controlled based on the allocation. Further, one or more offerings may be provided to the customer based on the allocation.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
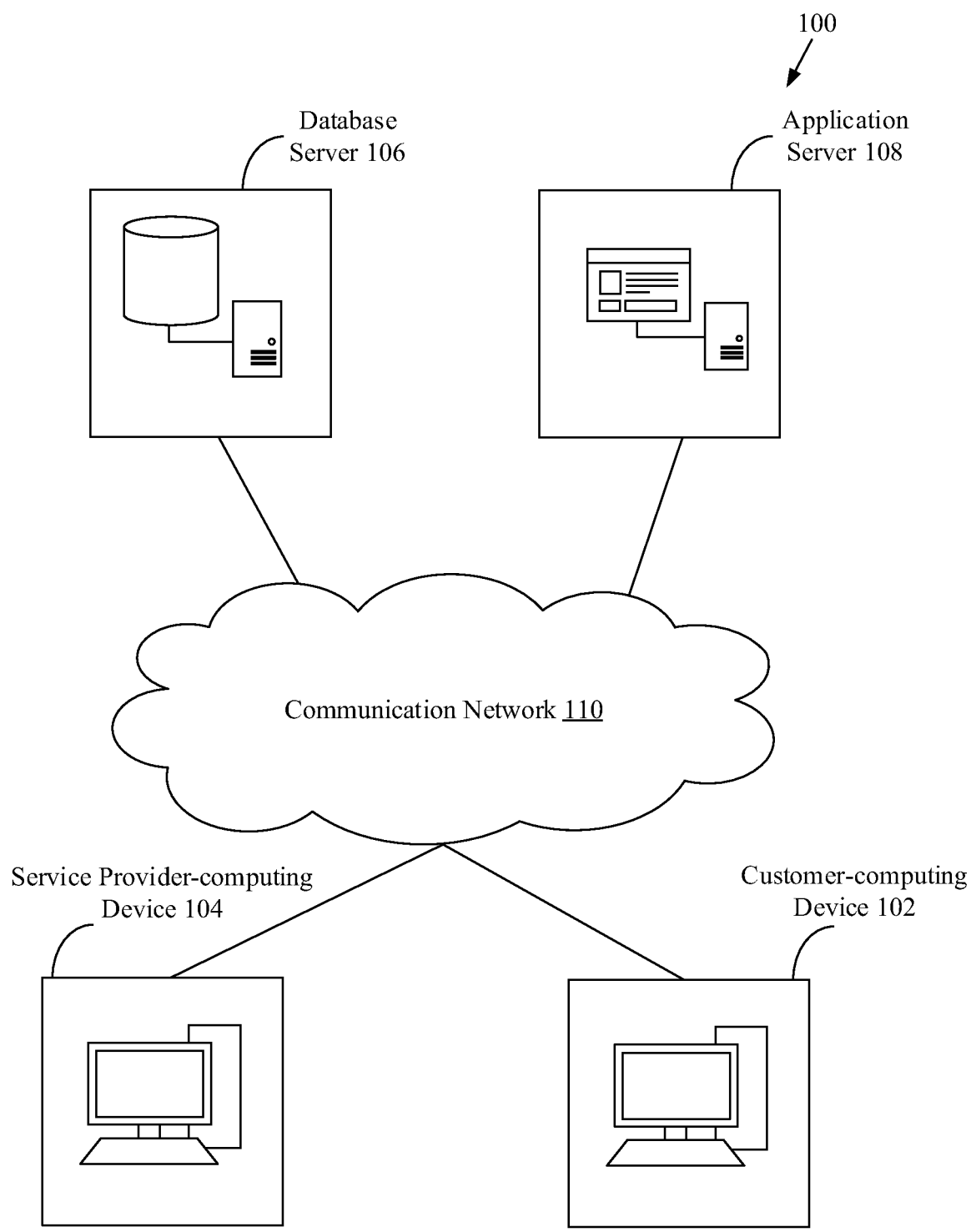
FIG. 1 is a block diagram that illustrates an exemplary system environment, in which various embodiments of the disclosed method and system to manage allocation of transportation services of a service provider to customers can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "customer-computing device" may refer to a computer, a device (that includes one or more processors/microcontrollers and/or any other electronic components), or a system (that performs one or more operations according to one or more programming instructions/codes) associated with a customer. The customer may correspond to an individual, who may be interested to rent a transportation service, such as a bus or a car, to travel from one location to another location. Based on an input provided by the customer, the customer-computing device may present a graphical user interface (GUI) to the customer for facilitating real-time (or non-real time) transportation services provided by a service provider. Based on the presented GUI, the customer may utilize the customer-computing device to provide preferences for one or more transportation services. Further, the customer may provide input to select, accept, or reject the one or more transportation services provided by the service provider. Examples of the customer-computing device may include, but are not limited to, a laptop, a personal digital assistant (PDA), a mobile device, a smartphone, and a tablet computer (e.g., iPad® and Samsung Galaxy Tab®).

A "service provider-computing device" may refer to a computer, a device (that includes one or more processors/microcontrollers and/or any other electronic components), or a system (that performs one or more operations according to one or more programming instructions/codes) associated with a service provider. The service provider may correspond to an individual, who is facilitating transportation services (e.g., buses, cars, and/or motor bikes of different types) to one or more customers for travel between at least two locations. The service provider-computing device may present a GUI to the service provider for displaying one or more travel requests received from one or more customer-computing devices. Further, the service provider-computing device may present another GUI to the service provider for displaying real-time availability status of the transportation services. Further, the service provider-computing device may present yet another GUI to the service provider for displaying an allocation of each of the transportation services. Further, the service provider-computing device may present yet another GUI to the service provider for displaying real-time status of KPI parameters, such as revenue or profit, based on deployment of the transportation services as per the allocation. The service provider may further utilize the service provider-computing device to input one or more offerings, such as a discounted service price, that may be offered to the one or more customers either for a real-time service or a non-real time service. Examples of the service provider-computing device may include, but are not limited to, a laptop, a PDA, a mobile device, a smartphone, and a tablet computer (e.g., iPad® and Samsung Galaxy Tab®).

A "customer" may refer to an individual, who may wish to avail a transportation service to travel from a source location to a destination location among a plurality of stations along a route. For example, an individual wants to travel from "Noida" to "Gurgaon." The individual may avail a transportation service, such as a bus service, for the travel. The individual may board a city bus, which is in transit from "Noida" to "Gurgaon," from "Noida." The individual may further alight the city bus at "Gurgaon." The individual may have to pay a certain service fare for availing the transportation service. In this scenario, the individual may correspond to the customer.

"Co-customers" may refer to one or more other customers who may travel along with a customer who has requested for a transportation service, such as a car, for travel from a source location to a destination location.

A "service provider" may refer to an entity or individual, who may be involved in an act of providing transportation services to one or more customers to travel from a source location to a destination location among a plurality of locations along a route, based on a request provided by the one or more customers. For example, a customer utilizes an application or a web page on a customer-computing device to input a request to travel from "a first station" to "a second station." Based on the request, the service provider may utilize the service provider-computing device to provide one or more available transportation services to the customer. The service provider may be associated with an on-demand transport provider, an intelligent multi-modal trip planner, and/or ride-sharing marketplaces.

"Transportation system" may correspond to transport facilities that may offer one or more means of transport of different types to one or more customers to travel from one location to another location. In an embodiment, the transportation system may correspond to a public transportation system, a private transportation system, a shared transportation system, and/or the like. Examples of various transportation systems may include one or more transportation services such as, but are not limited to, a bus transportation service, a train transportation service, a car transportation service, a motor bike transportation service, or an airplane transportation services. Hereinafter, "transportation system" and "transportation agency" may be interchangeably used.

A "service request" may refer to a request for a transportation service (e.g., a vehicle) by an individual, such as a customer, for travel from a source location to a destination location. In an embodiment, the customer may utilize a customer-computing device to input the service request. The customer-computing device may transmit the inputted service request by the customer to a computing server associated with an entity, such as an on-demand transport provider, an intelligent multi-modal trip planner, and ride-sharing marketplaces.

A "route" may refer to a path that may be traversed by a vehicle, while in transit. In an embodiment, the route may include a plurality of stations that may come in a defined order along the route. For example, a city bus travels from Harlem to East Village in New York. Thus, the path from Harlem to East Village may correspond to the route with Harlem and East Village being the plurality of stations. Further, the plurality of stations may include at least one pick-up station and one drop-off station.

A "vehicle" may refer to a transportation service that may be utilized to transport one or more customers and/or cargos between two or more stations or locations along a route of transit. In an embodiment, the one or more customers may share the vehicle with one or more other customers during the transit along the route. In an embodiment, the vehicle may be installed with a vehicle-computing device that may be utilized by an operating user (e.g., driver) of the vehicle to communicate with other individuals, such as the one or more customers and/or service providers. The vehicle may further include one or more sensors, such as a global positioning system, that may keep a track of a current location of the vehicle. In an embodiment, the vehicle may correspond to a bus, a truck, a car, a ship, an airplane, a motor bike, and/or the like. In an embodiment, the vehicle may be associated with one or more service types. The one or more service types in the vehicle may be defined based on one or more comfort features in the vehicle, for example, an availability of air conditioner (AC), seat belts, recliner, display device, luggage-storage space, and/or the like in the vehicle. The one or more service types may be defined based on a length of the vehicle, for example, a mini car, a micro car, a sedan car, an SUV car, a XUV car, and/or the like. The one or more service types may be defined based on a count of seats in the vehicle.

A "KPI" may refer to a parameter that may be used to evaluate one or more factors that define growth or success of an entity, such as a transportation agency associated with a service provider. Examples of the KPI may include at least one of, but are not limited to, a net revenue generated based on transit of one or more transportation services, a profit earned by the transportation agency based on a deployment of the one or more transportation services along one or more routes at one or more time instances of a defined time duration, and a count of customers carried by the one or more transportation services. In an embodiment, the service provider associated with the transportation agency may wish to continuously optimize the KPI for the continuous growth or success of the transportation agency. The service provider may further wish to continuously optimize the KPI for attracting more and more customers for travelling using the one or more transportation services. For example, the optimization of the KPI may refer to a maximization of the revenue generated or a maximization of the profit earned.

An "allocation" may refer to an assignment or distribution of one or more processes, services, or resources to one or more entities, such as one or more individuals or one or more organizations. For example, based on a travel request provided by a customer and an availability of one or more transportation services, a computing server may allocate at least one of the one or more transportation services to the customer for transit. In another example, the computing server may present a plurality of available transportation services to a customer-computing device associated with the customer based on the received travel request. Further, based on a selection of a transportation service from the plurality of available transportation services by the customer, the computing server may allocate the selected transportation service to the customer for the transit.

A "defined time duration" may refer to a time interval that is defined by an individual, for example, a service provider associated with a transportation system. The service provider may define the time duration either in real time or near-real time. In an embodiment, a computing server may generate allocation of one or more transportation services to one or more customers in the defined time duration to ensure that one or more KPIs, for example, a net revenue or a net profit in the defined time duration, may be maximized.

"Defined criteria of a transportation system" may refer to a set of rules, instructions, measures, or standards that are defined by an individual, such as a service provider associated with a transportation system, that may be utilized by a computing server for allocating one or more transportation services to one or more customers. The defined criteria of the transportation system may comprise one or more constraints based on at least one of a count, a type, an availability, a capacity, and/or the like of the one or more transportation services.

A "source station" may refer to a location from where a journey starts along a route. The source station may be associated with a transportation service and a customer. In an embodiment, the source station of the customer and the transportation service may or may not be same. For example, a transportation service provided by a vehicle, such as a bus, originates from "station-A" and terminates at "station-B." There are five intermediate stations between the "station-A" and the "station-B," for example, "station-1," "station-2," "station-3," "station-4," and "station-5." Therefore, in an event the customer boarded the bus at "station-A," then the source station of the customer and the transportation service is same. However, in an event the customer boarded the bus at "station-2," then the source station of the customer and the transportation service is not same. Hereinafter, the "source station" and the "source location" may be interchangeably used.

A "destination station" may refer to a location at which an ongoing journey terminates. The destination station may be associated with a transportation service and a customer. In an embodiment, the destination station of the customer and the transportation service may or may not be same. For example, a transportation service, such as a bus, originates from "station-A" and terminates at "station-B." There are five intermediate stations between the "station-A" and the "station-B," for example, "station-1," "station-2," "station-3," "station-4," and "station-5." Therefore, in an event the customer ends the journey and gets down from the bus at "station-B," the destination station of the customer and the transportation service is same. However, in an event the customer ends the journey and get down from the bus at "station-4," the source station of the customer and the transportation service is not same. Hereinafter, the "destination station" and the "destination location" may be interchangeably used.

A "service capacity" may refer to a maximum count of customers that may be accommodated by a transportation service, for example, a bus during a transit along a route that comprises a plurality of locations. For example, a city bus can accommodate a maximum of "15 customers." In this scenario, the service capacity of the city bus is "15." Hereinafter, "service capacity," "vehicle capacity," and "transport capacity" may be interchangeably used.

A "service cost" may refer to a monetary value that a customer may have to pay to an individual, such as a driver or a conductor of a vehicle, in exchange of using a transportation service, for example, a car. Hereinafter, "service cost" and "travel cost" may be interchangeably used.

A "travel time" may refer to time duration required to a travel between at least two locations, such as a source location and a destination location, by a transportation service, such as a bus. Hereinafter, "travel time" and "service time" may be interchangeably used.

A "pick-up time" may refer to a time instance (or a time stamp), specified by an individual, such as a customer, in a request for a transportation service for travel from a source location to a destination location. In an embodiment, the customer may expect to have the transportation service, such as a car, available at the source location at the pick-up time. In another embodiment, the pick-up time may be provided by a service provider (or a computing server of a transportation system associated with the service provider) to the customer, based on an availability of one or more transportation services. Hereinafter, "pick-up time" and "start time" may be interchangeably used.

A "waiting time" may refer to a time duration specified by an individual, such as a customer, in a request for a transportation service for travel from a source location to a destination location, for which the customer may wait for the transportation service at the source location. In another embodiment, the waiting time may be provided by a service provider (or a computing server of a transportation system associated with the service provider) to the customer, based on an availability of one or more transportation services.

"Real-time vehicle data" may refer to information of a vehicle that may indicate at least a current geographical location and a current booking status of the vehicle. The real-time vehicle data may further indicate a location where the vehicle may be heading towards with one or more customers i.e., a destination location of an ongoing travel request. Further, the real-time vehicle data may be indicative of an expected availability of the vehicle for another booking. The real-time vehicle data of the vehicle may further include choices of an operating user, for example, a driver of the vehicle.

An "availability status" of a vehicle may refer to a current state or condition of the vehicle to take up a new travel request. In an event the vehicle is occupied with one or more customers of a previous travels request, then the vehicle is unavailable for the new travel request. In an event the vehicle is unoccupied, i.e., independent of any customer, then the vehicle may be available for the new travel request.

A "flexible service type" may refer to a service that is different from a requested service by a customer, but may fulfill needs of the customer. Further, the flexible service type may be associated with a reduced service price as compare to the requested service. For example, the customer requested for a vehicle, such as a sedan car with AC, in which two person including the customer will travel from a source location to a destination location. However, the sedan car is not available. But a hatchback car is available that includes the AC. Further, the service cost of the hatchback car is less than the service cost of sedan car. Even if the service cost of the hatchback car is not less than the service cost of sedan car, the service provider may offer the hatchback car at the lesser service cost. In such a case, the hatchback car may be referred to as the flexible service type.

A "notification message" may refer to an electronic message (e.g., a short message service (SMS), an Email, and/or the like) that is transmitted by a computing server to one or more customer-computing devices of one or more customers. In an embodiment, the notification message may be indicative of at least a confirmation or a rejection for a transportation service by a service provider.

FIG. 1 is a block diagram that illustrates an exemplary system environment, in which various embodiments of the disclosed method and system to manage allocation of transportation services of a service provider to customers can be implemented. With reference to FIG. 1, there is shown a system environment 100 that includes a customer-computing device 102, a service provider-computing device 104, a database server 106, and an application server 108. The system environment 100 further includes a communication network 110. Various devices in the system environment 100 may be interconnected over the communication network 110, as shown. FIG. 1 shows, for simplicity, one customer-computing device, such as the customer-computing device 102, one service provider-computing device, such as the service provider-computing device 104, one database server, such as the database server 106, and one application server, such as the application server 108. However, it will be apparent to a person having ordinary skill in the art that the disclosed embodiments may also be implemented using multiple customer-computing devices, multiple service provider-computing devices, multiple database servers, and multiple application servers without departing from the scope of the disclosure.

The customer-computing device 102 may refer to a computing device that includes one or more processors in communication with one or more memory units. Further, in an embodiment, the one or more processors may be operable to execute one or more sets of computer-readable code, instructions, programs, or algorithms that are stored in the one or more memory units to perform one or more operations. The customer-computing device 102 may be further communicatively coupled to other devices over the communication network 110. The customer-computing device 102 may be associated with a user, such as a customer or a traveler, who may be interested to rent a transportation service, such as a bus, a car, or a motor bike, to travel from one location to another location. In such a case, the customer may utilize the customer-computing device 102 to input a service request for travel. The service request may comprise information that indicate at least a source location, a destination location, a pick-up time, a waiting time, a travel route, a count of co-customers who may travel along with the customer, and/or other travel-related information. The customer may further utilize the customer-computing device 102 to provide one or more preferences for one or more transportation services, for example, a bus, a car, a motor bike, and/or the like. The one or more preferences may further indicate preferences for one or more types of the one or more transportation services. For example, for a transportation service, such as a car, the various types may correspond to a mini car, a compact car, a hatchback car, a mid-size car, a sedan car, an executive car, a premium car, and/or the like. The customer-computing device 102 may further transmit the travel request along with the one or more preferences provided by the customer to the application server 108, via the communication network 110.

The customer-computing device 102 may further include a display screen that may be configured to display one or more travel options in response to the travel request of the customer, at a GUI rendered by the application server 108 over the communication network 110. For example, the application server 108 may render a GUI displaying one or more service types of one or more available transportation services and a service cost for using each of the one or more available transportation services. After the customer has selected a transportation service type from the one or more available transportation services, the application server 108 may display a notification message at the GUI. The notification message may comprise a confirmation message pertaining to an allocation of the selected transportation service type to the customer by the application server 108. The notification message may further comprise the service cost of the transportation service type allocated to the customer.

Further, the customer may view or track the current location of the allocated transportation service type on the display screen of the customer-computing device 102 over the communication network 110.

Examples of the customer-computing device 102 may include, but are not limited to, a personal computer, a laptop, a PDA, a mobile device, a tablet, or other such computing devices.

The service provider-computing device 104 may refer to a computing device that includes one or more processors in communication with one or more memory units. Further, in an embodiment, the one or more processors may be operable to execute one or more sets of computer-readable code, instructions, programs, or algorithms that are stored in the one or more memory units to perform one or more operations. The service provider-computing device 104 may be further communicatively coupled to other devices over the communication network 110. The service provider-computing device 104 may be associated with a user, such as a service provider of a transportation system, who may be involved in facilitating the one or more transportation services to one or more customers. For example, the transportation system may correspond to an on-demand transport provider, an intelligent multi-modal trip planner, and/or ride-sharing marketplaces. The service provider may utilize the service provider-computing device 104 to view one or more service requests received from one or more customer-computing devices, such as the customer-computing device 102. Based on the received one or more service requests, the service provider may provide an input to the application server 108 to check for availability of the one or more transportation services.

The service provider-computing device 104 may further include a display screen that may be configured to display the allocation of the one or more transportation services (and associated service costs) to the one or more customers generated by the application server 108. Further, the display screen may display real-time geographical location and availability status of the one or more transportation services. The display screen may further display real-time status of one or more KPI parameters, such as a net revenue or a net profit, that may have been attained based on deployment of the one or more transportation services as per the generated allocation.

Examples of the service provider-computing device 104 may include, but are not limited to, a personal computer, a laptop, a PDA, a mobile device, a tablet, or other such computing devices.

The database server 106 may refer to a computing device or a storage server that may be communicatively coupled to the communication network 110. In an embodiment, the database server 106 may be configured to perform one or more database operations. The one or more database operations may include one or more of, but are not limited to, receiving, storing, processing, and transmitting one or more queries, data, or content. The one or more queries, data, or content may be received/transmitted from/to various components of the system environment 100. For example, the database server 106 may be configured to store the received one or more service requests and preferences of the one or more customers for the one or more transportation services and associated service types. The database server 106 may further store historical choice data of the one or more customers for the travel using the one or more transportation services in the past. The database server 106 may further store a choice model of the one or more customers that may indicate a likelihood to select a transportation service from the one or more transportation services by each of the one or more customers. The database server 106 may be further configured to store real-time vehicle data of one or more vehicles of different service types, received from one or more sensors or computing devices (e.g., a vehicle computing device (not shown)) associated with the one or more vehicles. The database server 106 may be further configured to store previous allocations of the one or more transportation services to the one or more customers. The database server 106 may be further configured to store the one or more KPI parameters specified by the service provider. The one or more KPI parameters may be correspond to one or more valuation parameters that are utilized to define a growth or success of the transportation system, or satisfactions of the one or more customers. For example, the one or more KPI parameters may correspond to one or more of, but are not limited to, a net revenue generated and a net profit earned based on the deployment of the one or more transportation services along the one or more routes at one or more time instances. The one or more KPI parameters may be further associated with target customers that can be carried by the one or more transportation services during the defined time duration. In an embodiment, the database server 106 may be configured to receive one or more queries from the application server 108 for retrieval of information associated with the one or more service requests, the one or more preferences, the historical choice data, the one or more KPI parameters, the previous allocations, and/or the like.

For querying the database server 106, one or more querying languages, such as, but not limited to, SQL, QUEL, and DMX, may be utilized. In an embodiment, the database server 106 may connect to the application server 108, using one or more protocols, such as, but not limited to, the ODBC protocol and the JDBC protocol. In an embodiment, the database server 106 may be realized through various technologies such as, but not limited to, Microsoft® SQL Server, Oracle®, IBM DB2®, Microsoft Access®, PostgreSQL®, MySQL®, and SQLite®.

The application server 108 may refer to an electronic device, a computing device, or a software framework hosting an application or a software service that may be communicatively coupled to the communication network 110. In an embodiment, the application server 108 may be implemented to execute one or more sets of instructions, programs, routines, scripts, code, and/or the like, stored in one or more memory units for supporting the hosted application or the software service. In an embodiment, the hosted application or the software service may be configured to perform one or more operations for managing the allocation of the one or more transportation services of the service provider to the one or more customers.

The application server 108 may receive the service request for the vehicle of a preferred service type for travel from the customer-computing device 102 over the communication network 110. Further, the application server 108 may receive the real-time vehicle data of a plurality of vehicles of a plurality of service types from at least the one or more sensors in the plurality of vehicles. Alternatively, the application server 108 may retrieve the service request and the real-time vehicle data from the database server 106 over the communication network 110. Thereafter, the application server 108 may be configured to detect an availability status of each of the plurality of vehicles based on the received real-time vehicle data and the received service request. The availability status of each of the plurality of vehicles may be detected to determine a plurality of available service types in the plurality of service types for the travel associated with the received service request. The detection of the availability status of each of the plurality of vehicles has been described in detail, for example, in FIG. 3.

The application server 108 may be further configured to render, in response to the received service request, at least the determined plurality of available service types at the GUI displayed on the display screen of the customer-computing device 102. The application server 108 may further display the service cost pertaining to each of the plurality of available service types along with the plurality of available service types on the GUI. The determined plurality of available service types may comprise at least a flexible service type. The flexible service type may be determined based on the plurality of available service types. The service cost pertaining to the flexible service type in the plurality of available service types is less than the service cost pertaining to each of remaining service types in the plurality of available service types. The inclusion of the flexible service type in the plurality of available service types has been described in detail, for example, in FIG. 3 and FIG. 4.

Based on a selection of a service type from the rendered plurality of available service types by the customer for the travel, the application server 108 may be configured to allocate the selected transportation service to the customer. The application server 108 may further transmit the notification message to the customer-computing device 102, based on the selected service type by the customer that is further used for the allocation of the transportation service to the customer. The notification message may comprise a confirmation message about the allocated service type to the customer along with the associated service cost. In an event the allocated service type corresponds to the flexible service type, the notification message may comprise one or more offerings, for example, a discounted service cost, a payback amount, and/or coupon codes.

The application server 108 may be further configured to control the allocation of the transportation services based on a subsequent service request by another customer in an event the source location associated with the subsequent service request is within a defined threshold distance of a destination location of the customer. Similarly, the allocation of the transportation services may be further controlled in an event a pick-up time associated with the subsequent service request is within a defined threshold time of an arrival time of the customer to the destination location. Such controlled allocation of the transportation services to the one or more commuters by the application server 108 may help in optimal optimization of the one or more KPI parameters for the service providers.

A person having ordinary skill in the art will appreciate that the usage of words, such as minimize, maximize, optimize, and/or any other similar words, in the disclosure are to be construed broadly within the ongoing practical context, and should not be construed as yielding a provable mathematical maximum or optimum solution.

Furthermore, such controlled allocation of the transportation services may facilitate efficient utilization of the transportation services. Furthermore, such controlled allocation of the transportation services may enhance customer satisfaction that may result into increases business, and thus, increases revenue and profit. The allocation of the transportation services has been described in detail, for example, in FIG. 3 and FIG. 4.

After completion of a ride based on the allocated service type, the application server 108 may present a feedback interface on the display screen of the customer-computing device 102. Based on the feedback data received from the customer-computing device 102, one or more deficiencies in one or more service qualities of the transportation services may be improved upon by the service provider to enhance the one or more service qualities in the transportation services of the transportation system.

The application server 108 may be realized through various types of application servers, such as, but not limited to, a Java application server, a .NET framework application server, a Base4 application server, a PHP framework application server, or any other application server framework.

A person having ordinary skill in the art will appreciate that the scope of the disclosure is not limited to realizing the application server 108 and the database server 106 as separate entities. In an embodiment, the functionalities of the database server 106 may be integrated into the application server 108, without departing from the scope of the disclosure. Further, in an embodiment, the application server 108 may be realized as an application program installed and/or running on the service provider-computing device 104, without limiting the scope of the disclosure.

The communication network 110 may correspond to a medium through which queries, content and messages flow among various devices, such as the customer-computing device 102, the service provider-computing device 104, the database server 106, and the application server 108, of the system environment 100. Examples of the communication network 110 may include, but are not limited to, a the Internet, a cloud network, a Long Term Evolution (LTE) network, Wireless Fidelity (Wi-Fi) network, a Wireless Area Network (WAN), a Local Area Network (LAN), or a Metropolitan Area Network (MAN). Various devices in the system environment 100 can connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

Figure 2:
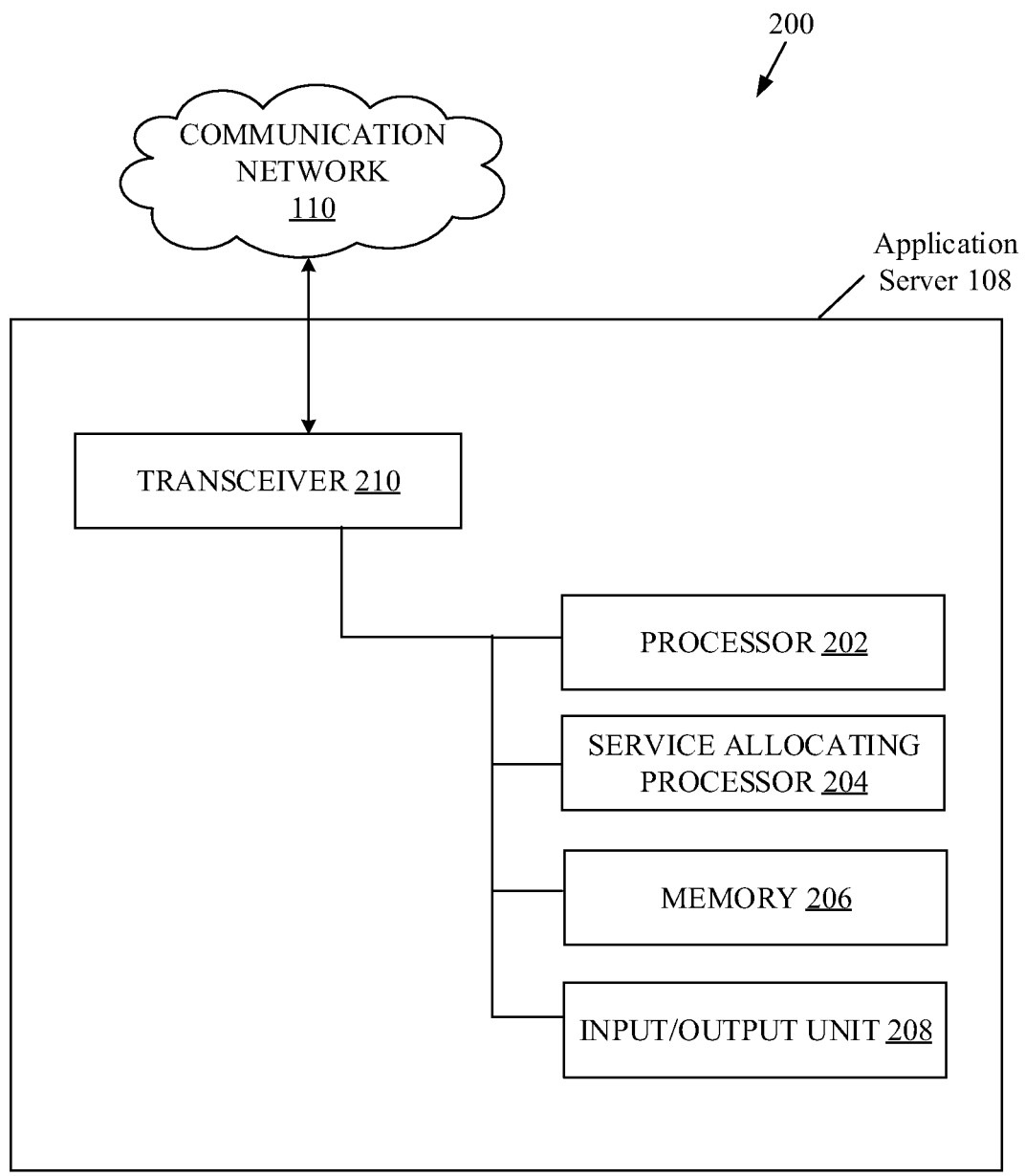
FIG. 2 is a block diagram that illustrates an exemplary application server to manage allocation of transportation services of a service provider to customers, in accordance with at least one embodiment.

FIG. 2 is a block diagram that illustrates an exemplary application server to manage allocation of transportation services of a service provider to customers, in accordance with at least one embodiment. FIG. 2 has been described in conjunction with FIG. 1. With reference to FIG. 2, there is shown a block diagram of the exemplary application server, such as the application server 108 that may include one or more circuits to manage allocation of the transportation services of the service provider to the customers. The one or more circuits may correspond to a processor 202, a service allocating processor 204, a memory 206, an input/output (I/O) unit 208, and a transceiver 210. With reference to FIG. 2, there is further shown the communication network 110 (FIG. 1).

In accordance with an embodiment, the processor 202 may be communicatively coupled to the service allocating processor 204, the memory 206, the I/O unit 208, and the transceiver 210. The transceiver 210 may be configured to communicate with the customer-computing device 102, the service provider-computing device 104, and the database server 106, via the communication network 110, under the control of the processor 202.

The processor 202 may include suitable logic, circuitry, code, and/or interfaces that may be configured to execute one or more instructions stored in the memory 206. The processor 202 may further include a computational and control unit (not shown). The computational and control unit may be configured to perform one or more mathematical and logical operations, and may further control the operations. The processor 202 may execute one or more sets of instructions/programs/code/scripts stored in the memory 206 to perform one or more operations for managing the allocation of the one or more transportation services of the service provider to the one or more customers. In an embodiment, the processor 202 may be configured to detect the availability status of the one or more vehicles based on real-time vehicle data of the one or more vehicles. Further, the processor 202 may be configured to render the plurality of available service types, based on the detected availability status, at the GUI displayed on the display screen of the customer-computing device 102. The processor 202 may further monitor and control the one or more KPI parameters for the service provider, based on the allocation of the one or more transportation services generated by the service allocating processor 204. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, a Complex Instruction Set Computing (CISC) processor, and/or other processors or control circuits.

The service allocating processor 204 may include suitable logic, circuitry, code, and/or interfaces that may be configured to execute one or more instructions stored in the memory 206. The service allocating processor 204 may execute one or more sets of instructions/programs/code/scripts stored in the memory 206 to perform one or more operations. For example, the service allocating processor 204 may be configured to allocate the one or more transportation services to the one or more commuters, based on at least the availability of the one or more vehicles and the received one or more service requests. The service allocating processor 204 may be implemented based on a number of processor technologies known in the art. Examples of the service allocating processor 204 may include, but are not limited to, an X86-based processor, a RISC processor, an ASIC processor, a CISC processor, and/or other processors or control circuits.

Though the service allocating processor 204 is depicted as a separate entity (FIG. 2), a person skilled in the art will appreciate that the scope of the disclosure is not limited to realizing the functionality of the service allocating processor 204 by the processor 202. In an embodiment, the service allocating processor 204 may be implemented within the processor 202 without departing from the spirit of the disclosure. Further, a person skilled in the art will understand that the scope of the disclosure is not limited to realizing the service allocating processor 204 as hardware components. In an embodiment, the service allocating processor 204 may be implemented as a software module included in computer program code (stored in the memory 206), which may be executable by the processor 202 to perform the functionalities of the service allocating processor 204.

The memory 206 may comprise suitable logic, circuitry, interfaces, and/or code that may be configured to store one or more machine codes and/or computer programs having at least one code section executable by the processor 202, the service allocating processor 204, the I/O unit 208, and the transceiver 210. The memory 206 may store the one or more sets of instructions that are executable by the processor 202, the service allocating processor 204, the I/O unit 208, and the transceiver 210. In an embodiment, the memory 206 may include one or more buffers (not shown). The one or more buffers may be configured to temporarily store the one or more service requests received from the one or more commuters. The one or more buffers may further temporarily store the real-time vehicle data of the one or more vehicles. The one or more buffers may further temporarily store the one or more KPI parameters and the associated desired values, the defined criteria, a current operating status of the one or more transportation services, a current service demand, feedback data, and/or the like. Examples of some commonly known memory implementations may include, but are not limited to, a random access memory (RAM), a read only memory (ROM), a hard disk drive (HDD), and a secure digital (SD) card. In an embodiment, the memory 206 may include the one or more machine codes, and/or computer programs that are executable by the processor 202, the service allocating processor 204, and the transceiver 210 to perform specific operations for managing the allocation of the one or more transportation services of the service provider to the one or more customers. It will be apparent to a person having ordinary skill in the art that the one or more instructions stored in the memory 206 may enable the hardware of the application server 108 to perform the one or more operations, without deviating from the scope of the disclosure.

The I/O unit 208 may comprise suitable logic, circuitry, interfaces, and/or code that may be configured to provide an output to the service provider of the transportation system. The I/O unit 208 comprises various input and output devices that are configured to communicate with the processor 202, the service allocating processor 204, and the memory 206. Examples of the input devices include, but are not limited to, a keyboard, a mouse, a joystick, a touch screen, a microphone, a camera, and/or a docking station. Examples of the output devices include, but are not limited to, a display screen and/or a speaker.

The transceiver 210 may comprise suitable logic, circuitry, interfaces, and/or code that may be configured to receive/transmit the one or more queries, service requests, user preferences, historical choice data and/or other information from/to one or more computing devices or servers (e.g., the customer-computing device 102, the service provider-computing device 104, and/or the database server 106) over the communication network 110. The transceiver 210 may be designed using one or more known technologies to support wired or wireless communication with the communication network 110. In an embodiment, the transceiver 210 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
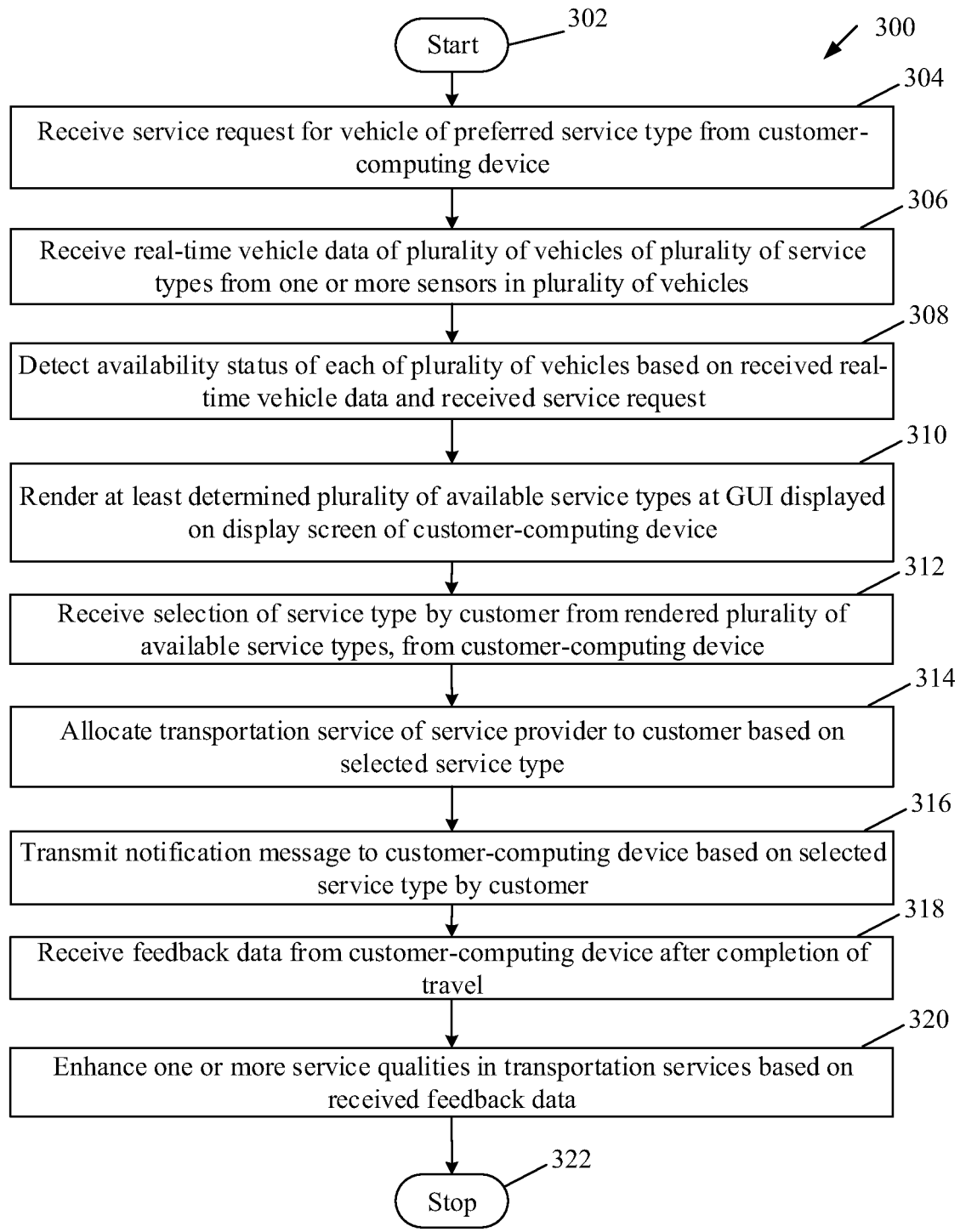
FIG. 3 is a flowchart that illustrates a method to manage allocation of transportation services of a service provider to customers, in accordance with at least one embodiment.

FIG. 3 is a flowchart that illustrates a method to manage allocation of transportation services of a service provider to customers, in accordance with an embodiment. FIG. 3 is described in conjunction with FIG. 1 and FIG. 2. With reference to FIG. 3, there is shown a flowchart 300 that illustrates a method for managing the allocation of the one or more transportation services (e.g., the one or more vehicles) of the service provider to the one or more customers. The method starts at step 302 and proceeds to step 304.

At step 304, the service request for the vehicle of the preferred service type is received from the customer-computing device 102 associated with the customer. The service request may comprise a request for travel from the source location to the destination location as specified by the customer, by means of the requested vehicle. In an embodiment, the transceiver 210 may be configured to receive the service request from the customer-computing device 102 over the communication network 110.

Prior to the transmission of the service request by the customer-computing device 102, the customer may utilize the customer-computing device 102 to connect to a service-providing platform (e.g., an on-demand transport provider platform, an intelligent multi-modal trip planner platform, and/or a ride-sharing marketplace platform) associated with the service provider over the communication network 110. Once the connection with the service-providing platform is established, the customer may utilize the customer-computing device 102 to input the service request for the travel. The customer may further input additional travel-related information. For example, the service request may further comprise the information that indicate at least the source location, the destination location, the pick-up time, the waiting time, the travel route, the count of co-customers who may travel along with the customer, and/or like. The customer may further utilize the customer-computing device 102 to provide the one or more preferences for the one or more transportation services, for example, a bus, a car, or a motor bike. The one or more preferences may further indicate preferences for the one or more service types associated with the one or more transportation services. The one or more service types may be associated with one or more comfort features in the one or more transportation services, for example, availabilities of AC, seat belts, recliner, display device, luggage-storage space, rooftop window, and/or the like in the vehicle. Further, the one or more service types may be based on a segment type (using length) of each of the one or more transportation services. For example, for a transportation service, such as a car, the various segment types may correspond to a mini car, a compact car, a hatchback car, a mid-size car, a sedan car, an executive car, a premium car, and/or the like.

After inputting the service request, the customer may provide another input to initiate the transmission of the service request to the service-providing platform (e.g., the application server 108, may be referred to as an allocation engine of the service-providing platform). Based on the received another input, the customer-computing device 102 may transmit the inputted service request along with the one or more preferences to a receptor, such as the transceiver 210, via the communication network 110. The transceiver 210 may receive the service request that comprises the one or more preferences of the customer, from the customer-computing device 102. Further, the transceiver 210 may store the received service request for the travel in a storage device, for example, the database server 106 or the memory 206.

At step 306, the real-time vehicle data of the plurality of vehicles of the plurality of service types is received from the one or more sensors in the plurality of vehicles. The real-time vehicle data of a vehicle may correspond to information that is indicative of at least a current geographical location and a current booking status of the vehicle. The real-time vehicle data of the vehicle may further include the destination location where the vehicle may be heading for, when the vehicle is already serving a travel request. The real-time vehicle data of the vehicle may further indicate an expected availability of the vehicle for another booking. In an embodiment, the transceiver 210 may be configured to receive real-time vehicle data of the plurality of vehicles from the one or more sensors, for example, a GPS sensor in the plurality of vehicles. The real-time vehicle data of the plurality of vehicles may be further received from a plurality of computing devices (e.g., a plurality of vehicle-computing devices) associated with the plurality of vehicles. The real-time vehicle data of the plurality of vehicles may be further received from one or more image-capturing devices (e.g., a camera) that are installed along the one or more routes. After receiving the real-time vehicle data, the transceiver 210 may store the received real-time vehicle data in the storage device, for example, the database server 106 or the memory 206.

At step 308, the availability status of each of the plurality of vehicles is detected based on the received real-time vehicle data and the received service request. The availability status of each of the plurality of vehicles may be detected to determine the plurality of available service types in the plurality of service types for the travel associated with the received service request. In an embodiment, the processor 202 may be configured to detect the availability status of each of the plurality of vehicles. Further, the processor 202 may be configured to determine the plurality of available service types based on the detected availability status of each of the plurality of vehicles. In an exemplary scenario, based on the received real-time vehicle data, the availability status of each of the plurality of vehicles may be detected. Further, the current geographical location of each of the plurality of available vehicles may be determined. Thereafter, for each available vehicle in the plurality of available vehicles, the processor 202 may compare the current geographical location of each available vehicle with the source location in the received service request to determine if the current geographical location is within a defined threshold distance of the source location. The processor 202 may further perform a check to determine if the available vehicle can reach the source location at the pick-up time (if specified by the customer). The processor 202 may perform the check based on at least the distance of the available vehicle from the source location and a current traffic situation along the one or more routes to reach the source station. Based on such comparison, the processor 202 may detect a plurality of available vehicles for the travel associated with the received service request. The plurality of available vehicles may also include one or more available vehicles that may not be able to meet the one or more preferences specified by the customer in the service request. Based on the detected plurality of available vehicles, the processor 202 may determine the plurality of available service types for the travel.

At step 310, the determined plurality of available service types is rendered at the GUI displayed on the display screen of the customer-computing device 102. In an embodiment, in response to the received service request, the processor 202 may be configured to render at least the determined plurality of available service types at the GUI displayed on the display screen of the customer-computing device 102. The processor 202 may further render the service cost pertaining to each of the plurality of available service types at the GUI. The service cost may include a fixed service part and a variable service part. The variable service part may be determined based on at least the distance travelled between the source location and the destination location. The variable service part may be further determined based on traffic halts along the journey between the source location and the destination location.

In an embodiment, the determined plurality of available service types rendered at the GUI may further include the flexible service type. The flexible service type may be determined based on the plurality of available service types. Further, the service cost pertaining to the flexible service type in the plurality of available service types is less than the service cost pertaining to each of the remaining service types in the plurality of available service types. For example, let there are two available service types (e.g., a car service type "A" and an auto-rickshaw service type "B") that may be used to serve a service request received from a commuter, who has a preference for the car service type. The service provider charges "$P_A$" for using the car service type "A" and "$P_B$" for using the auto-rickshaw service type "B." Further, the service provider may also provide the flexible service type "AB" which if chosen by the customer, may allow the service provider to serve the service request using a vehicle that is of either service type "A" or "B," irrespective of the preference mentioned by the commuter in the service request. The service cost charged by the service provider for using the flexible service type "AB" is "$P_{AB}$" that may be less than "$P_A$" and "$P_B$."

At step 312, the selection of the service type by the customer from the rendered plurality of available service types is received from the customer-computing device 102. In an embodiment, the transceiver 210 may receive the selection of the service type by the customer, from the rendered plurality of available service types at the customer-computing device 102.

Prior to the transmission of the selected service type by the customer-computing device 102, the customer may utilize the customer-computing device 102 to view the plurality of available service types along with the corresponding service cost that are rendered at the GUI displayed on the display screen of the customer-computing device 102. Further, the customer may make the selection of the service type from the rendered plurality of available service types according to his/her choice model that may depend on the service cost of each of the rendered plurality of available service types. After the selection of the service type from the rendered plurality of available service types by the customer, the customer-computing device 102 may transmit the selected service type to the database server 106 or the transceiver 210 over the communication network 110.

At step 314, a transportation service of the service provider may be allocated to the customer based on the selected service type. In an embodiment, the service allocating processor 204 may be configured to allocate the transportation service of the service provider to the customer based on the selected service type by the customer.

In an embodiment, the service allocating processor 204 may further control the allocation of the transportation service based on the subsequent service request by another customer. For example, in an event the source location in the subsequent service request is within the defined threshold distance of the destination location of the customer who is currently being served, then the service allocating processor 204 may allocate the transportation service to the another customer. Similarly, the allocation of the transportation services may be further controlled in an event the pick-up time associated with the subsequent service request is within the defined threshold time of the arrival time of the customer to the destination location. Based on such controlled allocation of the one or more transportation services to the one or more customers, the one or more KPI parameters, such as number of allocations, services utilization, revenue, profit, or measures of quality of the services, may be optimized that is required for the growth and success of the transportation system of the service provider. Furthermore, the one or more transportation services may be efficiently utilized. Furthermore, such allocation of the one or more transportation services may allow the one or more customers to earn the one or more offerings. The one or more offerings, for example, a discounted service cost, a payback amount, and/or a coupon code, may be associated with the flexible service type that has been recommended to the one or more customers. Furthermore, such controlled allocation of the one or more transportation services may increase service satisfaction among the one or more customers that may result into the increased business, and thus, may result into the increased revenue and profit. The management of the allocation of the one or more transportation services of the service provider to the one or more customers to optimize the one or more KPIs and to ensure increase in the business has been described below with illustrative examples:

Consider a set of customers "$N_t$" who may have requested for various transportation services by time "t." Consider a set of transportation services "M" (taxis or vehicles) that the service provider may want to allocate to the set of customers "$N_t$" to maximize the one or more KPIs. Each transportation service may be of any of the available "T" substitutable types.

The one or more customers in the set of customers may arrive in an online fashion. For example, a customer "j" makes a request at time "$r_j$" with an arrival and departure time. Further, each customer may specify a particular service type as a preferred service type. The customer "j" may be served if and only if the customer "j" is assigned a transportation service at the arrival time. Every pair of customers may further have a context switch time "$s_{jk}$" between them, which may indicate that any transportation service that serves customer "k" immediately after customer "j" may have to spend at least "$s_{jk}$" time from the current time.

For simplicity of the notational convenience, let "$A_t$" denotes the "$N_t$" dimensional allocation vector at the time "t" whose index may be the customer number and value may be the vehicle (number) allocated to the customer. This may imply that "$A_t(i)$" is the vehicle allocated to the customer $1 \leq i \leq N_t$. The application server 108 may retrieve, and then, execute the one or more sets of instructions, code, algorithms, programs, and/or the like, from the memory 206 to generate the allocation of the transportation services to the set of customers. For example, the application server 108 may utilize an algorithm, such as a flexible allocation algorithm as described in Algorithm-1, stored in the memory 206, to generate the allocation of the transportation services to the set of customers. During the execution of the flexible allocation algorithm, the application server 108 may retrieve a partial allocation subroutine from the memory 206 that takes into account previous allocations and the current set of customers to output new allocations for the set of customers who may have requested service start time strictly greater than "t."

Algorithm-1: Flexible Allocation Algorithm
Input: At each time t: $N_t$, $\{A_u : u < t\}$, M
Output: At each time: $A_t$
for t=1, 2, ... do
  $A_t \leftarrow$ PartialAllocate($N_t$, $\{A_u : u < t\}$, M);
end PartialAllocate Algorithm:

The application server 108 may implement the retrieved partial allocate algorithm using an integer linear programming (ILP) strategy. In an event all the customers whose requested service start times may be greater than "t," then an allocation solution may be generated by the application server 108 by use of the ILP-1 (as shown below) that may assign a sequence of customers to each of the "M" transportation services such that a KPI, such as a total number of customers served (i.e., target customers) may be maximized. Further, in an embodiment, other KPIs, such as revenue, profit, quality of service measures, which are functions of the allocations may be captured with the same mathematical formulation as below (ILP-1) with minor changes in the objective. The mathematical programming formulation for maximizing the number of allocations is as follows:

ILP-1:

$$\min \Sigma_{m \in M} \Sigma_{j \in N} \Sigma_{k \in N} x_{mjk} \qquad (1)$$

such that $$x_{mjk} \leq \Sigma_{l \in T} RT_{ml} CT_{jl} CT_{kl} \ \forall m \in M, \forall j, k \in N \qquad (2)$$

$$\Sigma_{k \in N} x_{m0k} \leq 1 \ \forall m \in M \qquad (3)$$

$$\Sigma_{m \in M} \Sigma_{k \in N} x_{mjk} \leq 1 \ \forall j \in N \qquad (4)$$

$$\Sigma_{h \in N \cup \{0\}, h \neq j, h \neq k} x_{mhj} \leq x_{mjk} \ \forall m \in M, \forall j, k \in N, j \neq k \qquad (5)$$

$$x_{mjk} \leq CP_{jk} \ \forall m \in M, \forall j, k \in N \qquad (6)$$

$$\Sigma_{m \in M} \Sigma_{j \in N} x_{mjk} \leq 1 \ \forall k \in N \qquad (7)$$

$$x_{mjk} \in \{0,1\} \ \forall m \in M, \forall j, k \in N \qquad (8)$$

The data matrices "RT" and "CT" may correspond to the service type of the vehicles and the service type(s) selected by the customers, respectively. In an embodiment, "$RT_{ml}$" is "1" in an event the vehicle "m" is of the service type "1," and otherwise "$RT_{ml}$" is "0." Similarly, in an embodiment, "$CT_{jl}$" is "1" in an event the customer "j" has requested for the service type "1," and otherwise "$CT_{jl}$" is "0." The data matrix "CP" may capture an idea of precedence between the customers. In an embodiment, "$CP_{jk}$" is "1" in an event a sum of a departure time of the customer "j" and a time for the vehicle to move from the customer "j" to the customer "k" is less than or equal to the requested start time of the customer "k," and otherwise "$CP_{jk}$" is "0." Thus, these matrices may satisfy the following relations:

$$RT_{ml} \in \{0,1\} \ \forall m \in M, \forall l \in T$$

$$CT_{jl} \in \{0,1\} \ \forall j \in N, \forall l \in T$$

$$CP_{jk} \in \{0,1\} \ \forall j \in N, \forall k \in N$$

$$\Sigma_{l \in T} RT_{ml} \leq 1 \ \forall m \in M$$

$\sum_{l \in T} CT_{jl} \leq 1 \ \forall j \in N$

In an embodiment, a binary decision variable "$x_{mjk}$" may be set to "1" in an event the customers "j" and "k" are allocated to the transportation service (e.g., a vehicle) "m" in immediate succession. Thus, the objective function defined as $\sum_{m \in M} \sum_{j \in N} \sum_{k \in N} x_{mjk}$ may capture the number of allocations of the customers to the transportation services. In an embodiment, the constraint (2) may ensure that the decision variable is "1" only if the service type preferences of the customers "j" and "k" are same as the service type of the vehicle "m." In an embodiment, the constraint (3) may ensure that at most one customer is allocated to any vehicle at the beginning of time by use of a concept of a dummy user indexed using "0." In an embodiment, the constraint (4) may ensure that at most one customer precedes any customer "k" who may have been allocated to the transportation service "m." In an embodiment, the constraint (5) may ensure that at least one customer (including a dummy customer) precedes the customers "j" and "k" when allocated to the transportation service "m." In an embodiment, the constraint (6) may imply that the customers "j" and "k" may not be allocated to the transportation service "m" unless the sum of the departure time of the customer "j" and the time to move from the customer "j" to the customer "k" is less than or equal to the requested start time of the customer "k." In an embodiment, the constraint (7) may ensure that any customer "k" may be assigned to at most one vehicle and further, may succeed at most one other customer "j."

Further, in an embodiment, the previous allocation data $\{A_u : u < t\}$ may be utilized by the application server 108 to impose one or more additional constraints with respect to the one or more customers whose requested service start time is less than or equal to "t" (as such one or more customers cannot be reallocated from the services that are currently serving them). Such constraints may be defined as "$x_{mjk}=1$" in an event the customer "k" was assigned to the transportation service "m" previously and that customer's requested service start time is less than or equal to "t."

PartialAllocate-2 Algorithm (with Preferences and Prices and No Context-Switch Costs):

The application server 108 may execute the partial allocate algorithm (i.e., PartialAllocate-2 algorithm based on ILP) retrieved from the memory 206. The PartialAllocate-2 algorithm may be executed by the application server 108, when the one or more customers may have ordinal preferences over the transportation services (instead of selecting a single transportation service) and when there is no cost for the transportation service to serve the customer "j" followed by the customer "k."

For example, let "M" be the set of transportation services and "N" be the set of customers. Further, consider that the time is divided into one or more slots. At each time slot, any transportation service may serve at most one customer. In an embodiment, a customer may be characterized by the following attributes: (a) "$r_j$" is the request time of the customer "j," (b) "$s_j$" is the specified start time of the customer "j," (c) "$p_j$" is a number of processing units required by the customer "j," (d) "$b_j$" is total money that can be spend by the customer "j" (or budget), and (e) "$\sigma_j$" is a preference order on transportation services by the customer "j." Further, "$\sigma_j(m)$" may take a value in M that represents a rank of the transportation service "m." In an embodiment, the transportation service may be characterized by its pricing "$w_m$," which corresponds to a price that the service provider may charge when allocating the transportation service "m".

In an embodiment, the application server 108 may allocate the transportation service to the customer only if the budget of the customer is at least equal to the service price of the transportation service specified by the service provider. Further, one customer may be processed by the application server 108 for at most one transportation service. In an embodiment, the customer may be processed for the transportation service "m" only if the customer is processed for each of the $p_j$ time units from $(s_j, s_{j+1}]$ to $s_j+p_j-1, s_j+p_j]$ on the transportation service "m." Let $x_{jm}$ be the decision variable that may take a value "1" if the customer $j \in J$ has been assigned to the transportation service $m \in M$. The mathematical programming formulation for maximizing the number of allocations is as follows:

$$\sum_{j \in N} \sum_{m \in M} x_{jm} w_m - \beta \sum_{j \in N} \sum_{m \in M} x_{jm} \sigma_m(m) \text{ such that} \quad (9)$$

$$x_{jm} w_m \leq b_j \forall \ j \in N, \forall \ i \in M \quad (10)$$

$$\sum_{m \in M} x_{jm} \leq 1 \forall \ j \in N \quad (11)$$

$$\frac{1}{p_j} \sum_{i=s_j}^{s_j+p_j-1} y_{jmi} \geq x_{jm} \forall \ j \in N, \forall \ m \in M \quad (12)$$

$$\sum_{j \in J} y_{jmi} \leq 1 \forall \ m \in M, \forall \ i \in \left[\max_{j \in J}(s_j + p_j)\right] \quad (13)$$

$$x_{jm} \in \{0, 1\} \forall \ m \in M, , \forall \ j \in N \quad (14)$$

$$y_{jmi} \in \{0, 1\} \forall \ m \in M, , \forall \ j \in N, \forall \ i \in \left[\max_{j \in J}(s_j + p_j)\right] \quad (15)$$

Here, $\beta > 0$ is a constant to trade-off between two competing objectives. The first term in the objective function given by equation (9) is the revenue which the service provider may earn. The second term in the objective function given by equation (9) is a measure of Quality of Service (QoS) provided by the service provider to the customer.

At step 316, the notification message may be transmitted to the customer-computing device 102 over the communication network 110, based on the selected service type by the customer associated with the customer-computing device 102. In an embodiment, the transceiver 210, under the control of the processor 202, may transmit the notification message to the customer-computing device 102 over the communication network 110. The notification message may be rendered at the GUI displayed on the display screen of the customer-computing device 102. Based on the rendered notification message, the GUI on the display screen may display a message that confirms about the allocation of the transportation service to the customer. The GUI may further display the service cost associated with the allocated transportation service. In an embodiment, the notification message about the allocated transportation service (e.g., an allocated vehicle) may be revealed to the customer in a timely fashion. For example, the notification message may not be revealed immediately after the selection is made by the customer, and may be revealed (i.e., transmitted to the customer-computing device 102) just before the requested service pick-up time with some buffer time for the allocated vehicle to reach the customer.

At step 318, the feedback data is received from the customer-computing device 102 over the communication network 110. In an embodiment, the transceiver 210 may be configured to receive the feedback data from the customer-computing device 102 over the communication network 110, after the completion of the travel (or ride) of the customer using the allocated service type, i.e., the allocated vehicle type. The feedback data may include one or more responses corresponding to one or more questionnaires rendered at the GUI after the completion of the travel. The one or more questionnaires may include one or more questions corresponding to the one or more comfort features, services, or pricing associated with the allocated service type.

At step 320, the one or more service qualities in the transportation services may be enhanced based on the received feedback data. In an embodiment, the service provider may utilize the feedback data to improve upon the one or more service qualities in the transportation services of the transportation system. Such implementation of the feedback data may attract more customers for using the transportation services of the transportation system. Control passes to end step 322.

A person having ordinary skill in the art will understand that the abovementioned exemplary operations are for illustrative purpose and should not be construed to limit the scope of the disclosure. Further, the abovementioned exemplary operations may be implemented or executed in an offline mode (non-real time) as well as an online mode (real-time). The abovementioned operations have been further described with an illustrative example, for example, in FIG. 4.

Figure 4:
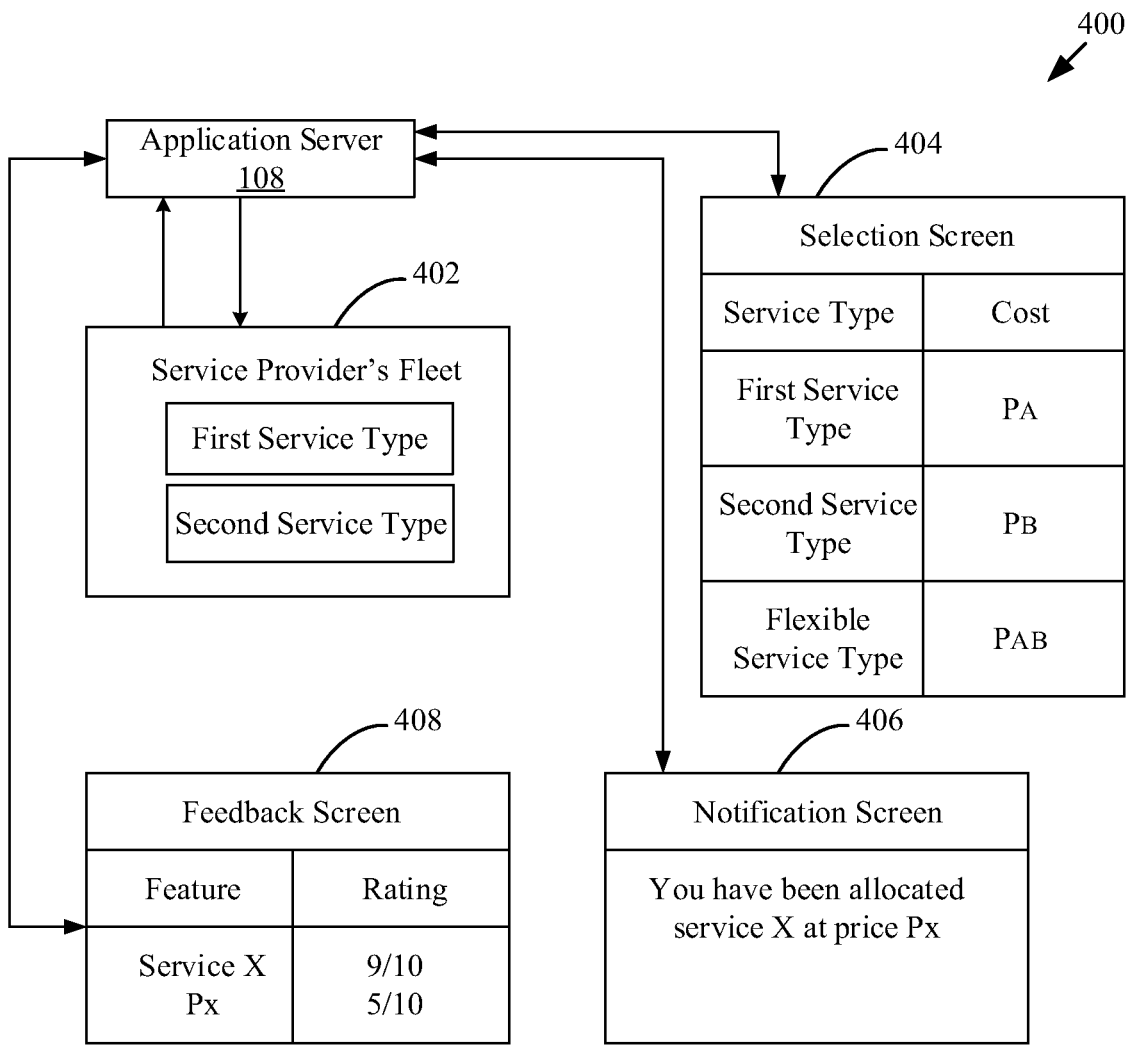
FIG. 4 is a block diagram that illustrates an exemplary scenario of an interaction of an allocation engine with customer's choices, in accordance with at least one embodiment.

FIG. 4 is a block diagram that illustrates an exemplary scenario of an interaction of an allocation engine with customer's choices, in accordance with at least one embodiment. FIG. 4 has been described in conjunction with FIG. 1, FIG. 2, and FIG. 3. With reference to FIG. 4, there is shown exemplary block diagrams, such as a service provider's fleet block 402, a selection screen block 404, a notification screen block 406, and a feedback screen block 408, as shown. With reference to FIG. 4, there is further shown an exemplary allocation engine, such as the application server 108 (FIG. 1).

In an embodiment, the service provider's fleet block 402 may indicate the one or more service types of the one or more transportation services associated with the transportation system of the service provider. For example, the service provider's fleet block 402 indicates two service types, a first service type (e.g., a sedan car) and a second service type (e.g., a XUV car), as shown.

In response to the service request received from the customer-computing device 102, the application server 108 may render the selection screen block 404 at the GUI. The GUI may be displayed on the display screen of the customer-computing device 102. The rendered selection screen block 404 may comprise the plurality of available service types that comprises at least the flexible service type in addition to the first service type and the second service type, as shown. The rendered selection screen block 404 may further comprise the service cost, such as "$P_A$," "$P_B$," and "$P_{AB}$," of each of the plurality of available service types, as shown.

Based on the rendered selection screen block 404, the customer may select the service type of choice from the plurality of available service types. The selection of the service type may be further transmitted to the application server 108 by the customer-computing device 102, via the communication network 110. Similarly, the application server 108 may receive the selection of the service type from each of one or more other customer-computing devices during the defined time duration. Based on the selected service types by the one or more customers (that includes the customer associated with the customer-computing device 102 and the one or more other customers associated with the one or more other customer-computing devices), the application server 108 may generate the allocation of the one or more transportation services of the service provider to the one or more customers, such that the one or more KPIs are optimized. After generation of the allocation of the one or more transportation services to the one or more customers, the application server 108 may render the notification screen block 406 at the GUI. The GUI may be displayed on the display screen of one or more computing devices, such as the customer-computing device 102. The rendered notification screen block 406 may comprise the notification message that indicates the allocated service and the corresponding service cost. Further, the one or more transportation services may operate based on the generated allocation so as to serve the one or more customers. After the completion of the travel, the application server 108 may render the feedback screen block 408 at the GUI. The one or more customers may provide the feedback that may be further utilized by the service provider to enhance the one or more service qualities of the one or more transportation services. The management of the allocation of the one or more transportation services of the service provider to the one or more customers to optimize the one or more KPIs and to ensure increase in the business has been described above in FIG. 3.

A person having ordinary skill in the art will appreciate that the usage of words, such as minimize, maximize, optimize, and/or any other similar words, in the disclosure are to be construed broadly within the ongoing practical context (as discussed above with respect to FIG. 3 and FIG. 4), and should not be construed as yielding a provable mathematical maximum or optimum solution.

The disclosed embodiments encompass numerous advantages. The disclosure provides a method and a system for managing allocation of transportation services of a service provider to customers. The disclosed method facilitates matching of demand to a fixed supply for the service provider when substitutable modes of transportation services are available by offering price discounts in exchange for mode flexibility by the customers. By offering the user a discount for the flexibility of being served by any of the substitutable services, in lieu of paying full price on a specific service, the service provider can achieve maximization in the key performance indicators in much better way leading to more revenue or quality of service in a variety of operational regimes. The disclosed method is most applicable within the service provider and when the cost of adding supply may be high, for example a taxi provider with a fixed fleet. The disclosed allocation of the transportation services by the allocation engine may increase overall customer satisfaction that may help in expansion of the service provider.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for managing allocation of transportation services of a service provider to customers have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for managing, by a computing server, allocation of transportation services of a service provider to customers, said method comprising:

receiving, by a transceiver at said computing server, a plurality of service requests for a plurality of vehicles of a preferred service type for travel, from a plurality of customer-computing devices associated with a plurality of customers over a communication network, wherein said service requests for said plurality of vehicles of said preferred service type for travel comprise a rank of preferred service types and a source location;

receiving, by said transceiver, real-time vehicle data of a plurality of vehicles of a plurality of service types associated with said service provider from one or more sensors, or one or more vehicle-computing devices, in said plurality of vehicles over said communication network, the real-time vehicle data including at least a current geographical location;

detecting, by a processor at said computing server, an availability status of each of said plurality of vehicles based on said received real-time vehicle data including the current geographical location and said received service requests including the source location by determining if the current geographical location is within a threshold distance of the source location;

determining, by said processor, in response to said received service requests and the availability status of said plurality of vehicles, a plurality of available service types, the available service types comprising at least a flexible service type;

transmitting, by said transceiver, a plurality of available service types, said service types including a flexible service type, transmitted for rendering on a user interface displayed on a display screen of said customer-computing device;

receiving by said transceiver, over the communication network, a service type selection from the rendering on the user interface of said customer-computing device from multiple customer computing devices;

allocating, by a service allocating processor, an available vehicle of said plurality of vehicles of said service provider to each customer submitting a service type selection, based on the service type selection from said plurality of available service types, wherein the processor executes a flexible allocation algorithm for allocation, the flexible allocation algorithm maximizing one or more KPIs including at least a number of allocations, thereby maximizing a total number of served customers, the allocation comprising execution of the flexible allocation algorithm using an integer linear programming (ILP) strategy, wherein during the execution of the flexible allocation algorithm, the processor retrieves a partial allocation subroutine incorporating previous allocations and a current set of customers to output new allocations for the current set of customers requesting a service time later than a predetermined time in the future, the partial allocation subroutine imposing a constraint on members of the current set of customers requesting a service time equal to or earlier than the predetermined time in the future, the constraint preventing reallocation;

transmitting, by said transceiver, said allocation to each said customer submitting the service type selection and said service provider in real-time; and rendering, by the computing server, a graphical user interface including a confirmation message of the allocation and a tracking interface allowing customer viewing and tracking of a current location of the allocated vehicle on the display screen of the customer computing devices.

2. The method of claim 1, wherein said received service requests comprise at least a destination location, a count of co-customers who will travel along with said customer, a pick-up time, and a waiting time.

3. The method of claim 1, wherein said real-time vehicle data further comprises at least a current booking status, and an expected availability for another booking.

4. The method of claim 1, wherein said one or more KPIs are based on at least revenue, profit, service qualities, services utilization, or target customers that said service provider expects to achieve during a defined time period, based on said allocation of said transportation services during said defined time period.

5. The method of claim 1, wherein said allocation of said transportation services is further controlled based on a subsequent service request by another customer in an event a subsequent source location associated with said subsequent service request is within a defined threshold distance of a destination location of said customer.

6. The method of claim 5, wherein said allocation of said transportation services is further controlled in an event a pick-up time associated with said subsequent service request is within a defined threshold time of an arrival time of said customer to said destination location.

7. The method of claim 1 further comprising receiving, by said transceiver, feedback data from said customer-computing device after completion of said travel, wherein said received feedback data is further utilized by said service provider to enhance one or more service qualities in said transportation services.

8. A system for managing allocation of transportation services of a service provider to customers, said system comprising:

a transceiver at a computing server configured to:
receive a plurality of service requests for a plurality of vehicles of a preferred service type for travel, from a plurality of customer-computing devices associated with a plurality of customers over a communication network, wherein said service requests for said plurality of vehicles of said preferred service type for travel comprises a rank of preferred service types and a source location;

receive real-time vehicle data of a plurality of vehicles of a plurality of service types associated with said service provider from one or more sensors, or one or more vehicle-computing devices, in said plurality of vehicles over said communication network, wherein the real-time vehicle data includes a current geographical location;

transmit a plurality of available service types including at least a flexible service type, said service types, transmitted for rendering on a user interface displayed on a display screen of said customer-computing devices;

receive, over the communication network, a service type selection from the rendering on the user interface of multiple customer-computing devices;

a processor at said computing server configured to:
detect an availability status of each of said plurality of vehicles based on said received real-time vehicle data and said received service requests by comparing the source location with the current geographical location and determining if the current geographical location is within a threshold distance of the source location; and determine, in response to said received service requests, a plurality of available service types, that comprises at least a flexible service type based on said detecting; and a service allocating processor at said computing server configured to:
allocate an available vehicle of said plurality of vehicles of said service provider to a customer of said plurality of customers, based on the service type selection from said plurality of available service types by said customer for said travel, the allocation performed by executing a flexible allocation algorithm to maximize one or more KPIs including at least a number of allocations, thereby maximizing a number of served customers, the allocation comprising execution of the flexible allocation algorithm using an integer linear programming (ILP) strategy, wherein during the execution of the flexible allocation algorithm, the processor retrieves a partial allocation subroutine incorporating previous allocations and a current set of customers to output new allocations for the current set of customers requesting a service time later than a predetermined time in the future, the partial allocation subroutine imposing a constraint on members of the current set of customers requesting a service time equal to or earlier than the predetermined time in the future, the constraint preventing reallocation;

wherein said transceiver is further configured to transmit said allocation to each said customer submitting a service type selection and said service provider over the communication network in real-time and the processor is further configured for rendering a graphical user interface including a confirmation message of the allocation and a tracking interface allowing customer viewing and tracking of a current location of the allocated vehicle on the display screen of the customer computing device.

9. The system of claim 8, wherein said received service requests further comprise at least a destination location, a count of co-customers who will travel along with said customer, a pick-up time, and a waiting time.

10. The system of claim 8, wherein said real-time vehicle data comprises at least a current booking status and an expected availability for another booking.

11. The system of claim 8, wherein said service allocating processor is further configured to control said allocation of said transportation services based on a subsequent service request by another customer in an event a subsequent source location associated with said subsequent service request is within a defined threshold distance of a destination location of said customer.

12. The system of claim 11, wherein said service allocating processor is further configured to control said allocation of said transportation services in an event a pick-up time associated with said subsequent service request is within a defined threshold time of an arrival time of said customer to said destination location.

13. The system of claim 8, wherein said transceiver is further configured to receive feedback data from said customer-computing device inputted by said customer after completion of said travel, wherein said received feedback data is further utilized by said service provider to enhance one or more service qualities in said transportation services.

14. A computer program product for use with a computer, said computer program product comprising a non-transitory computer readable medium, wherein said non-transitory computer readable medium stores a computer program code for allocation management of transportation services of a service provider to customers, wherein said computer program code is executable by one or more processors in a computing device to:

receive a plurality of service requests for a plurality of vehicles of a preferred service type for travel, from a plurality of customer-computing devices associated with a plurality of customers over a communication network, wherein said service requests for said plurality of vehicles of said preferred service type for travel comprises a rank of preferred service types and a source location;

receive real-time vehicle data of a plurality of vehicles of a plurality of service types associated with said service provider from one or more sensors, or one or more vehicle-computing devices, in said plurality of vehicles over said communication network, the real-time vehicle data including a current geographical location;

detect an availability status of each of said plurality of vehicles based on said received real-time vehicle data and said received service requests by comparing the source location and the current geographical location to determine if the current geographical location is within a threshold distance of the source location;

determine, in response to said received service requests, a plurality of available service types that comprises at least a flexible service type based on said detecting;

transmit a plurality of available service types including at least a flexible service type, said service types transmitted for rendering on a user interface displayed on a display screen of said customer-computing devices;

receive, over the communication network, a service type selection from the rendering on the user interface of said customer-computing device from multiple customer-computing devices;

allocate an available vehicle of said plurality of vehicles of said service provider to each customer submitting a service type selection, based on the service type selection from said plurality of available service types by said customer for said travel, the allocation configured to maximize one or more KPIs including at least one of a number of allocations, thereby maximizing a number of customers served, the allocation comprising execution of a flexible allocation algorithm using an integer linear programming (ILP) strategy, wherein during the execution of the flexible allocation algorithm, a service allocating processor retrieves a partial allocation subroutine incorporating previous allocations and a current set of customers to output new allocations for the current set of customers requesting a service time later than a predetermined time in the future, the partial allocation subroutine imposing a constraint on members of the current set of customers requesting a service time equal to or earlier than the predetermined time in the future, the constraint preventing reallocation;

transmit said allocation to each said customer submitting a service type selection and said service provider in real-time; and render a graphical user interface including a confirmation message of the allocation and a tracking interface allowing customer viewing and tracking of a current location of the allocated vehicle on the display screen of the customer computing device.

* * * * *